(No Model.) 2 Sheets—Sheet 2.
C. J. & R. H. BURK.
HARROW.
No. 262,926. Patented Aug. 22, 1882.
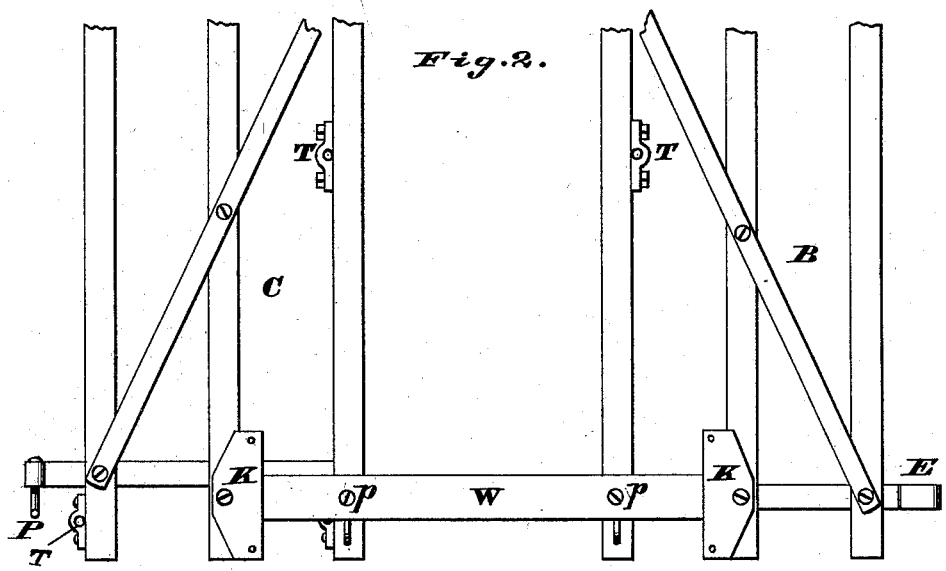
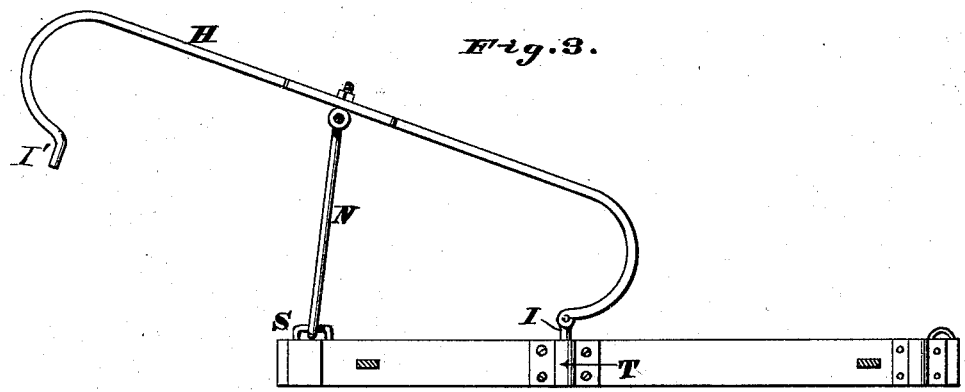
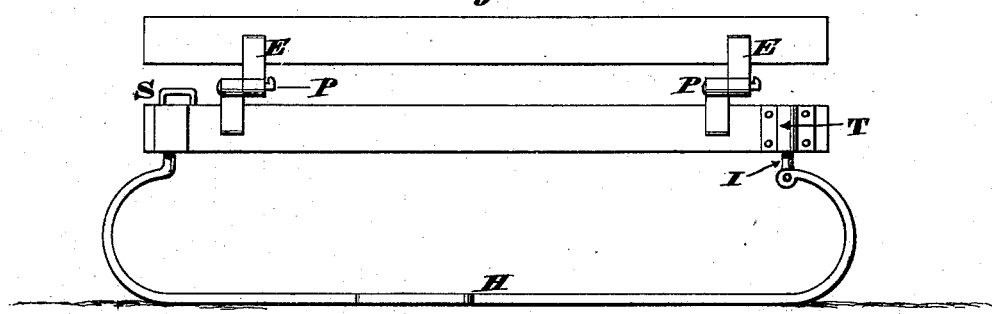

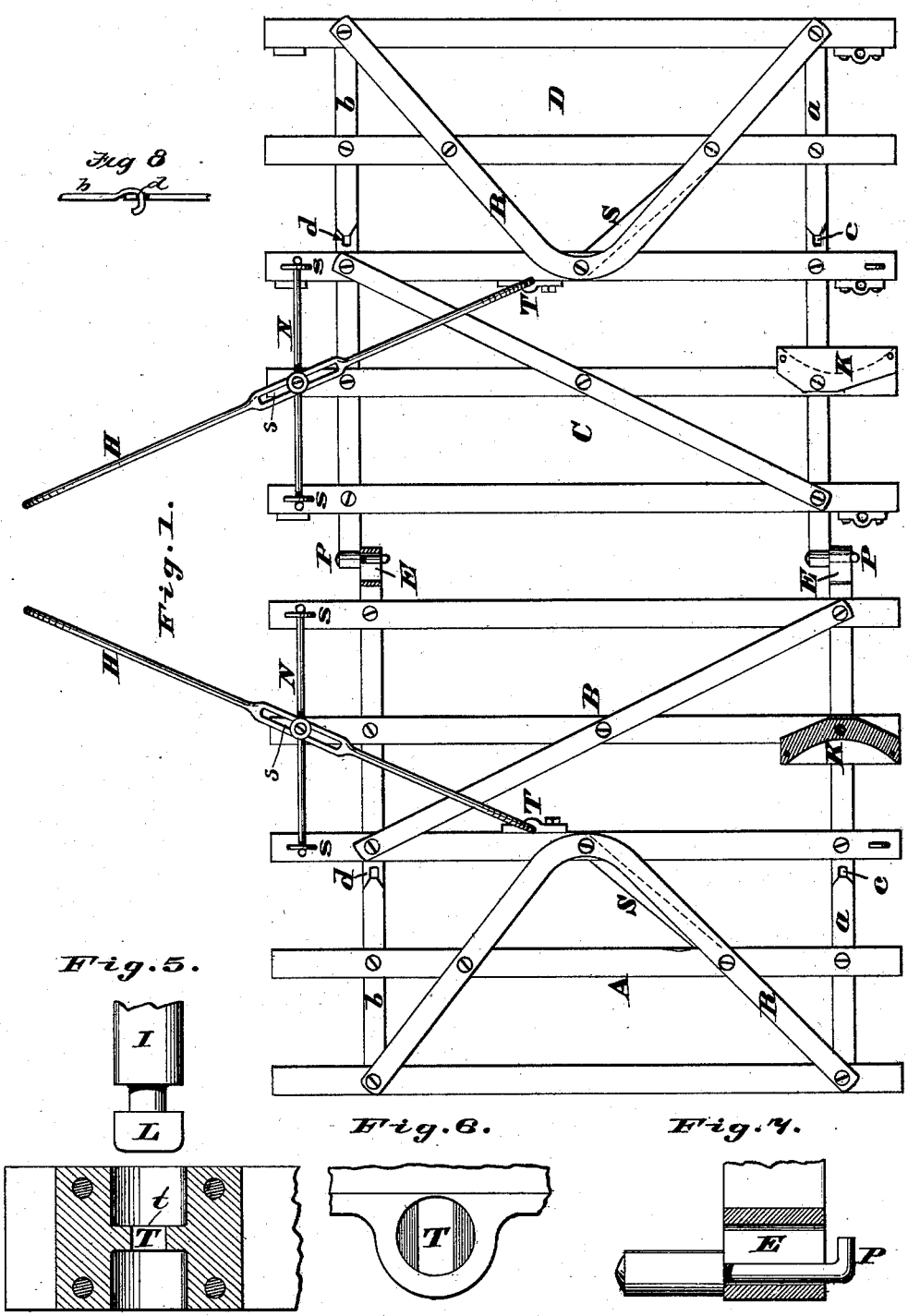

UNITED STATES PATENT OFFICE.

CALVIN J. BURK, OF ARCANUM, AND RICHARD H. BURK, OF WEST MANCHESTER, OHIO.

HARROW.

SPECIFICATION forming part of Letters Patent No. 262,926, dated August 22, 1882.

Application filed May 21, 1881. (No model.)

*To all whom it may concern:*

Be it known that we, CALVIN J. BURK, of Arcanum, Darke county, State of Ohio, and RICHARD H. BURK, of West Manchester, in the county of Preble and State of Ohio, have invented certain new and useful Improvements in Harrows; and we do hereby declare the following to be a full, clear, and exact description of the same.

Our invention consists in certain details of construction, which will be first described, and then pointed out particularly in the claim.

In the accompanying drawings, Figure 1 represents a plan view of the upper side of a harrow constructed from sections and put together for use. Fig. 2 is a modification of same, representing a harrow composed of but two sections. Fig. 3 is a side view of one section or part, showing the handle for guiding the harrow and the manner of its attachment. Fig. 4 is also a side view, showing one section upon the other, and the guiding-handle transformed into a runner in order that the whole may be easily removed to or from the field. Fig. 5 is a view of the pin on the end of the guiding-handle, which is designed to fit into the socket underneath, (shown in section,) whereby the same is properly fastened to the harrow. Fig. 6 is a plan view of the socket. Fig. 7 is a view in section of the hooked pin and socket by which the sections of the harrow are connected together, and Fig. 8 represents one of the joints between the outer and inner sections of the harrow.

Similar letters of reference in the drawings represent corresponding parts.

A, B, C, and D, Fig. 1, are sections of which the harrow is composed. The sections A and D are connected to sections B and C by means of the hooked metal pieces *a b*, fitting into the slots *c* and *d*, and as a further and additional means of connecting the aforesaid sections we employ the curved rods R. In fastening these rods to the section we prefer the way shown in the drawings, as by that method greater strength is secured, though any other desirable mode of fastening may be used. Upon the under side of sections A and D metal rods S are fastened at any desirable point, and these rods extend at an angle to correspond with the middle of the curvatures of rods R. These rods R and S embrace one side of frames B and C at the point of curvature, and are fastened by bolt and nut, as shown. This, with the hooks and slots before mentioned, forms a strong and easy mode by which the two outer sections can be rigidly connected to the inner ones. By removing the bolts which pass through the rods R and S the sections A D may be turned so as to disconnect them from the sections B C.

P P are pins fastened to the end frame of section C. These pins are curved at right angles, as seen in Fig. 7, or hooked, and they fit into the sockets E, attached to the end framework of section B. The hooks are for the purpose of preventing the pins from slipping out of the sockets. Thus are the sections connected together.

If it is desired to lessen the size of the harrow, two sections, such as B and C, (seen in Fig. 2,) are used, the positions being reversed from that shown in Fig. 1. The sections are connected together and held at a proper distance apart by a bar, W, of wood or metal, having apertures bored in it to receive small pins or bolts *p*, as shown. The ends of this piece W are held in place by sockets or keepers K, which are curved on the inside, as shown in Fig. 1. This curvature allows the sections to swing round easily and adapt themselves to the inequalities of the ground that is being worked.

H H are handles for guiding the harrow. These handles, as seen in Fig. 3, have a pin, I', formed upon one end, and a hinged pin, I, at the other end, the latter having a flat lug, L, on its end, which, when inserted into a socket, T, having an oblong opening in its part *t*, and turned round in a direction at right angles to that in which it entered, prevents the pin from coming out.

N N are rests for the handles H H to bear upon. These rests have at each of their ends hooks which enter staples *s*, driven into the frame-work composing the harrow. By means of a set-screw or proper clip passing through a slot in the handle the handles are made fast to these rests and can be adjusted at any angle to suit the workman, the rest being adapted to rock or swing back and forth to admit of this adjustment.

When going to or from the field the handles H H can be transformed into runners, upon which the harrow is placed. This is seen in Fig. 4. The handles H and rests N being removed, the sections A and B are turned over upon sections C and D by means of the hinges made from pins P and sockets E, and the handles are fastened in sockets, as seen in Fig. 4, additional sockets T being provided for this purpose. The harrow can then be drawn, like a sled, to any distance with little or no trouble.

It will thus be seen that we have a harrow which can be easily taken apart and put together, and one which we can make larger or smaller, as required, besides being of simple construction.

The teeth of the harrow we have not shown in the drawings, their construction, position, and function being well known.

We claim—

The guiding-handles H, having the pins I, with flat lugs L on their inner ends, in combination with the sockets T, with which said inner ends are adapted to be locked, and with the rocking supports and the slot and set-screws for locking the handles to the supports at the desired height, substantially as described.

In testimony whereof we have hereunto set our hands.

CALVIN J. BURK.
RICHARD H. BURK.

Witnesses:
EDUARD SCHMIDT,
PATRICK H. GUNCKEL.